May 10, 1955 P. M. G. TOULON 2,708,268

SEQUENTIAL PHASE-SHIFTED AMPLITUDE MODULATED CARRIER WAVE

Filed March 16, 1951 6 Sheets-Sheet 1

INVENTOR

P. M. G. TOULON

BY Moore and Hall

ATTORNEYS

May 10, 1955 P. M. G. TOULON 2,708,268

SEQUENTIAL PHASE-SHIFTED AMPLITUDE MODULATED CARRIER WAVE

Filed March 16, 1951 6 Sheets-Sheet 2

INVENTOR
P. M. G. TOULON

BY Moore and Hall

ATTORNEYS

SEQUENTIAL PHASE-SHIFTED AMPLITUDE MODULATED CARRIER WAVE

Filed March 16, 1951

INVENTOR

P. M. G. TOULON

BY Moore and Hall

ATTORNEYS

INVENTOR
P. M. G. TOULON

BY Moore and Hall

ATTORNEYS

INVENTOR

P. M. G. TOULON

BY Moore and Hall

ATTORNEYS

INVENTOR
P. M. G. TOULON
BY Moore and Hall
ATTORNEYS

United States Patent Office 2,708,268

Patented May 10, 1955

2,708,268

SEQUENTIAL PHASE-SHIFTED AMPLITUDE MODULATED CARRIER WAVE

Pierre Marie Gabriel Toulon, New York, N. Y., assignor, by direct and mesne assignments, of seventy-five per cent to Products and Licensing Corporation, New York, N. Y., a corporation of Delaware, and twenty-five per cent to Nelson Moore and William D. Hall, as joint tenants Application March 16, 1951, Serial No. 215,987

8 Claims. (Cl. 343—204)

This invention relates to a new form of carrier wave modulation, and to circuits for modulating a carrier wave in accordance with this new technique and for detecting a carrier wave so modulated. More particularly, this invention relates to a new method of wave transmission capable of promulgating a plurality of informations simultaneously, to be employed in electronic installations requiring such informations, such as color television transmission and reception.

It is an object of this invention to produce a new process of phase shift modulation wherein the phase is changed step by step, or by predetermined discrete information values, rather than by sinusoidal or constantly varying changes in phase, as has heretofore been employed.

It is a further object of this invention to disclose a new method of modulating a carrier wave, the modulated wave comprising a combination of phase shift modulation and amplitude modulation.

Still another object of this invention is the disclosure of a new process of phase shift modulation in which the phase of a carrier wave is changed step by step, in reference to a given predetermined datum, at constant and periodic intervals of time.

Another purpose of this invention lies in the production of a new form of modulation in which at least three types of information may be sent by one transmitted carrier. A still further ramification of this invention contemplates the transmission of reference or zero-phase shift information as well as other information.

Still another purpose of this invention is the disclosure of a new type of detection of frequency modulated or phase shift modulated waves, and circuits employing this type of detection.

Another purpose of this invention lies in a new process of varying the damping of an oscillatory circuit in course of time in accordance with a predetermined law, or in a periodic manner, or in accordance with the information present in a modulated wave.

Another object of this invention is the disclosure of circuitry employed in the generation of the new type of modulation, and for receiving and detecting that form of modulated wave. In addition, it is a further purpose to disclose the circuit of a new type of modulator in which the damping is varied in accordance with some law, rather than being continuously damped at a fixed value as has been done in prior art modulators. This invention also contemplates circuitry for sending and receiving stations utilizing this new type of modulation, and the new modulator and detector circuits.

A still further purpose lies in the application of the aforementioned circuitry and modulation in a color television circuit which is completely compatible, the information sent by an amplitude modulated portion of the waveform being detected in a channel separate from that used in the detection of other information present in the received waveform, this amplitude modulation information channel being preferably used in both color and black and white reception. The word "compatibility" is here employed to describe an arrangement whereby a classical "black and white" receiver can receive a given wave and interpret that wave as a black and white picture, while a color television receiver may receive that same wave and, through appropriate circuitry, interpret it as a colored picture. In this system, an amplitude modulated portion of the wave is preferably used for general information of the opacity of a given dot while phase shift portions of the wave are preferably used for color information. This system permits larger band width in the opacity information than has been possible in prior art systems, and also permits reduced band widths in the color information, each of the informations nevertheless being more precise than that possible in former systems.

This new type of modulation, when used in color television systems, can transmit both opacity information and color information simultaneously for a given dot, or it can be used to send opacity information for a given dot while simultaneously supplying color information for another dot on the same line, or on any other line of the same frame, or of a different frame. Furthermore, this system of modulation when employed in color television applications solves the problem of compatability by supplying orthochromatic information at the same time, and on the same wave, as it supplies red and blue information, this system allowing black and white receivers to utilize more of the high frequency band in using this orthochromatic information than has been possible in classical amplitude modulation systems. Moreover, this new system prevents the appearance of the "dot effect" normally present if the subject being televised is a monochrome, without any alteration in the normal construction of present day black and white receivers.

These and other objects will be readily apparent from the following discussion and accompanying drawings in which:

Figure 1, A–F, is a series of waveforms disclosing my new principle of modulation;

Figure 2, is a schematic diagram of a color television sending station employing my new modulation principle;

Figure 3, and Figure 4, A and B, are further waveforms appearing in applications of this invention;

Figure 5, A and B, discloses the circuits of variably damped oscillatory circuits employed in the invention;

Figure 8, A–E, shows still further waveforms appearing in the disclosed embodiment of this invention.

In the classical system of frequency or phase shift modulation, a carrier wave is constantly and sinusoidally varied about a mean frequency or datum phase. Only one information sequence may be transmitted, and this in accordance with the rapidity of frequency shift and the deviation of frequency from the mean. In contradistinction to such a process of sinusoidally varying the carrier frequency, the present invention contemplates the use of successive transmissions of the same frequency F, said frequency being maintained constant throughout a predetermined interval of time, but each successive transmission being phase shifted with reference to a predetermined datum in accordance with successive discrete values of information to be transmitted. In the interval of time between said constant frequency portions of the wave, it is evident that the carrier frequency must vary in order that the next constant frequency portion of the wave may commence at the desired phase shift.

However, this variation of frequency during such an interval follows no predetermined law, but occurs in response to a value of information to be transmitted, in order that the constant frequency portion of wave, following a given variable frequency portion, may be phase shifted a desired number of degrees. Moreover, in accordance with the present invention, the varying frequency interval portions of the wave are not utilized at the receiving station, said station using the information contained in the phase shift of each of the constant frequency portions.

Figures 1A, 1B, 1C, 1D, 1E, 1F:
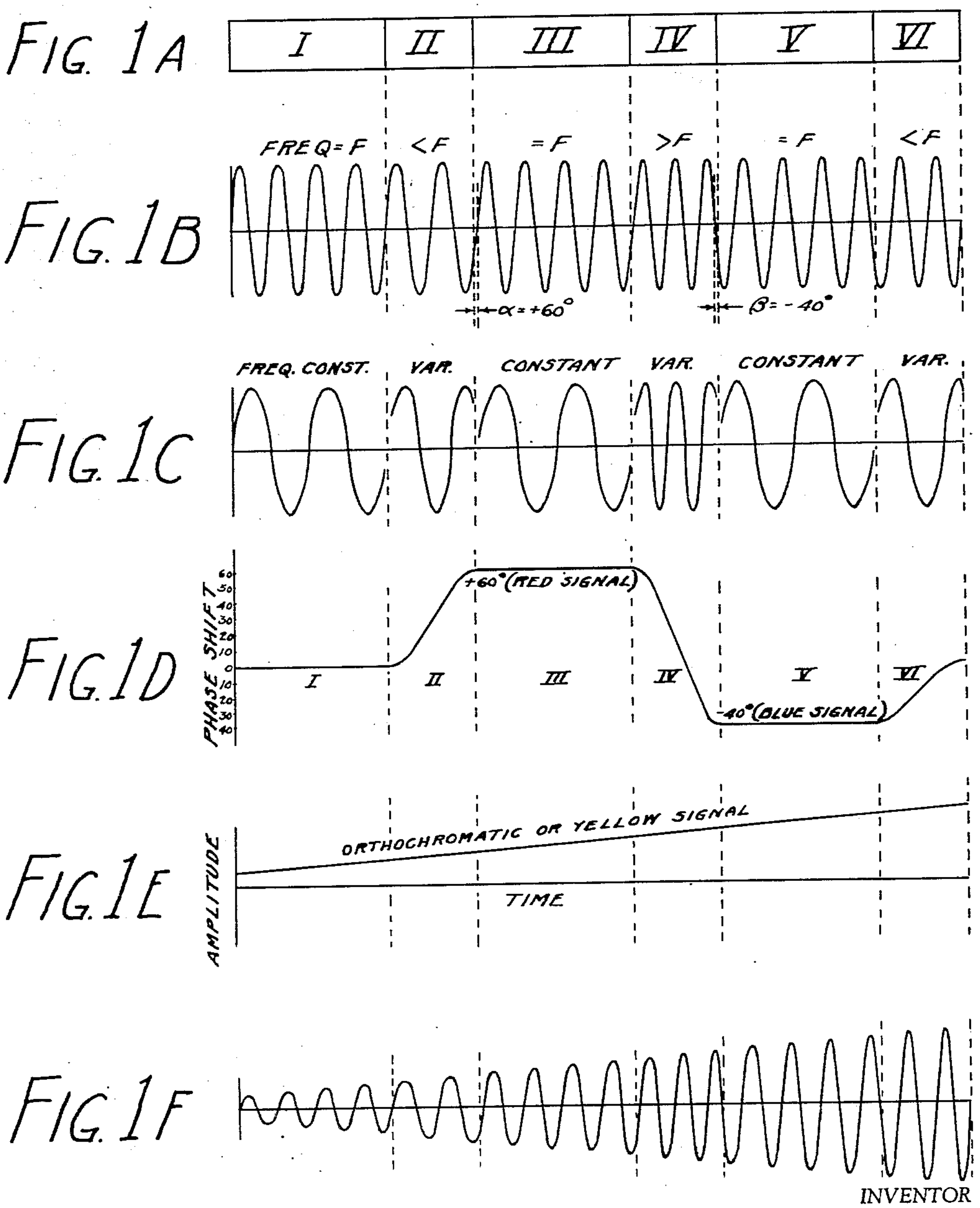

This may be more clearly seen by referring to Figure 1. As shown symbolically in Figures 1A and 1B, a transmitted wave in accordance with the invention will ordinarily contain two distinct portions, a constant frequency portion and a variable frequency portion, for each instantaneous value of information to be transmitted. Figure 1A, which discloses a wave form sending control information, red information, and blue information for color television applications consists of six distinct portions. Each of these six portions may most conveniently represent like time intervals, or alternate portions only may be of the same time interval, or all portions may be of different time intervals. For convenience of representation, portions I, II, and V of the wave have been shown as each occupying a first length of time, while portions II, IV, VI have been shown as each occupying a second and different length of time.

Referring now to Figure 1B, we see that, during an interval of time I, a constant frequency F, having zero phase shift with reference to a datum placed at the beginning of portion I, is transmitted. This zero phase shift, constant frequency portion is ordinarily used as a control oscillation in order to establish a reference for interpreting the phase shifts of subsequent portions of the wave. Inasmuch as parts I–VI ordinarily each represent the same interval of time, and further, inasmuch as the total time of parts I–VI of the wave is equal to that of one dot, the length of time occupied by each of parts I–VI is ordinarily $$\frac{1}{6\times 30\times 525\times 600}$$

second in the case of a television transmission employing 30 frames/sec., 525 lines/frame, and 600 dots/line. The frequency F, in this embodiment, has a wavelength of approximately one meter.

Parts III and V of the transmitted wave are, once more, of the same constant frequency F. These parts, however, are each phase shifted in respect to the reference of part I, part III being shifted a first number of degrees in accordance with the intensity of a first value of information to be transmitted, for instance the intensity of a red signal, and part V being shifted a second number of degrees in accordance with the intensity of a second value of information to be transmitted, for instance the intensity of a blue signal. The wave of Figure 1B illustrates the case wherein the intensity of the red dot is heavy, corresponding to ⅙ of a cycle, or 60 degrees, while the intensity of the blue wave is somewhat less, corresponding to ⅑ of a cycle, or 40 degrees. Furthermore, as shown in this form, the phase shift for the first value of information (part III) may be positive with respect to the reference oscillation, or datum, while the phase shift for the second value of information (part V) may be negative with respect to the reference oscillation or datum.

Between each of constant frequency portions I, III, and V, and following portion V in preparation for the next dot transmission, are variable frequency portions II, IV, and VI. Assuming that each of the parts I–VI are of the same time interval, the frequency of transition portion II will be something less than constant frequency F in order to effect the positive phase shift of portion III, while the frequency of transition portion IV will be something greater than F in order to effect the negative phase shift of portion V. Once more, the frequency of portion VI will be something less than F in order to bring the oscillation back to the zero phase shift point in time for the transmission of the next reference portion and dot cycle. This frequency relationship is shown symbolically, and to a larger scale in Figure 1C, no attempt having been made in this figure to set forth any of the phase relationships previously discussed.

The phase relationships are shown by the curve of Figure 1D. As disclosed in this curve, the phase shift remains zero throughout part I of the wave, this portion representing the reference. During portion II, the frequency being less than F, the phase shifts progressively in a positive direction until, at the beginning of part III, it has assumed the shift corresponding to the intensity of red signal for the given dot, in this case 60 degrees. Once more the phase remains constant throughout part III, the frequency being a constant herein. During part IV, the phase once more shifts progressively toward that value corresponding to the intensity of blue signal for the given dot, in this case minus 40 degrees. Again, the phase remains constant throughout period V and then, during period VI, shifts back to zero in order that a new wave may be transmitted with the proper shifts for the next dot.

In addition to the foregoing step by step process of transmitting the reference, blue, and red information, further information may be transmitted by amplitude modulating the sequentially phase shifted wave. In the case of color television, the amplitude modulation of the present invention is in complete accordance with the normal "black and white" amplitude modulation of the present time, without any restriction as to band width, and consequently without any reduction in the number of dots to be scanned. Such is not the case in any of the so called "compatible" systems known at the present time. This amplitude modulation would ordinarily be employed to transmit information corresponding to the yellow signal intensity of a given dot, or in those installations applying orthochromatic principles, the carrier would be amplitude modulated in accordance with the orthochromatic intensity.

This further step of modulation is illustrated in Figures 1E and 1F, the former showing the variation in intensity of orthochromatic or yellow signal for a given dot transmission, and the latter showing the wave of Figure 1B after having been amplitude modulated in accordance with this intensity. Thus, the wave of Figure 1E contains reference information, red and blue intensity information, by appropriate phase shifts, and yellow or orthochromatic information by amplitude modulation. We therefore have, in effect, a sequential phase shifted, amplitude modulated carrier wave.

A circuit receiving a signal such as has been above described employs a switching process acting to periodically transfer the received energy between appropriate channels. The result of this periodic switching is to introduce the power in a given channel only during a certain interval of time. More particularly, during the transition periods, when phase is not accurately determined, the variable frequency signal is completely suppressed. The received wave is allowed to actuate an oscillatory circuit only at a time when the phase shift has become stable, and the received signal is shifted from channel to channel to actuate first a reference oscillatory circuit, then a red channel oscillatory circuit, and then a blue channel oscillatory circuit. Consequently, only the constant phase shifts are employed, and these in turn accurately determine the operation of the receiver circuits.

It should further be noted that the signal described may be received and fed to two basic channels in a color television receiver. In the first channel, the signal may be detected in accordance with classical detection processes, the carrier eliminated, and the remaining amplitude modulation employed. This modulation would be employed in classical black and white AM receivers as the sole signal producing the picture. In color television receivers it would be used only as the yellow or orthochromatic signal. In the second basic channel, the signal may be passed through a limiter, and the resulting signal, as shown in Figure 1B, used to obtain the red and blue signals by the aforementioned switching process. Such a receiving system will be described in some detail subsequently. Let us first examine a circuit arrangement for producing a signal such as disclosed in Figure 1F.

Figure 2:
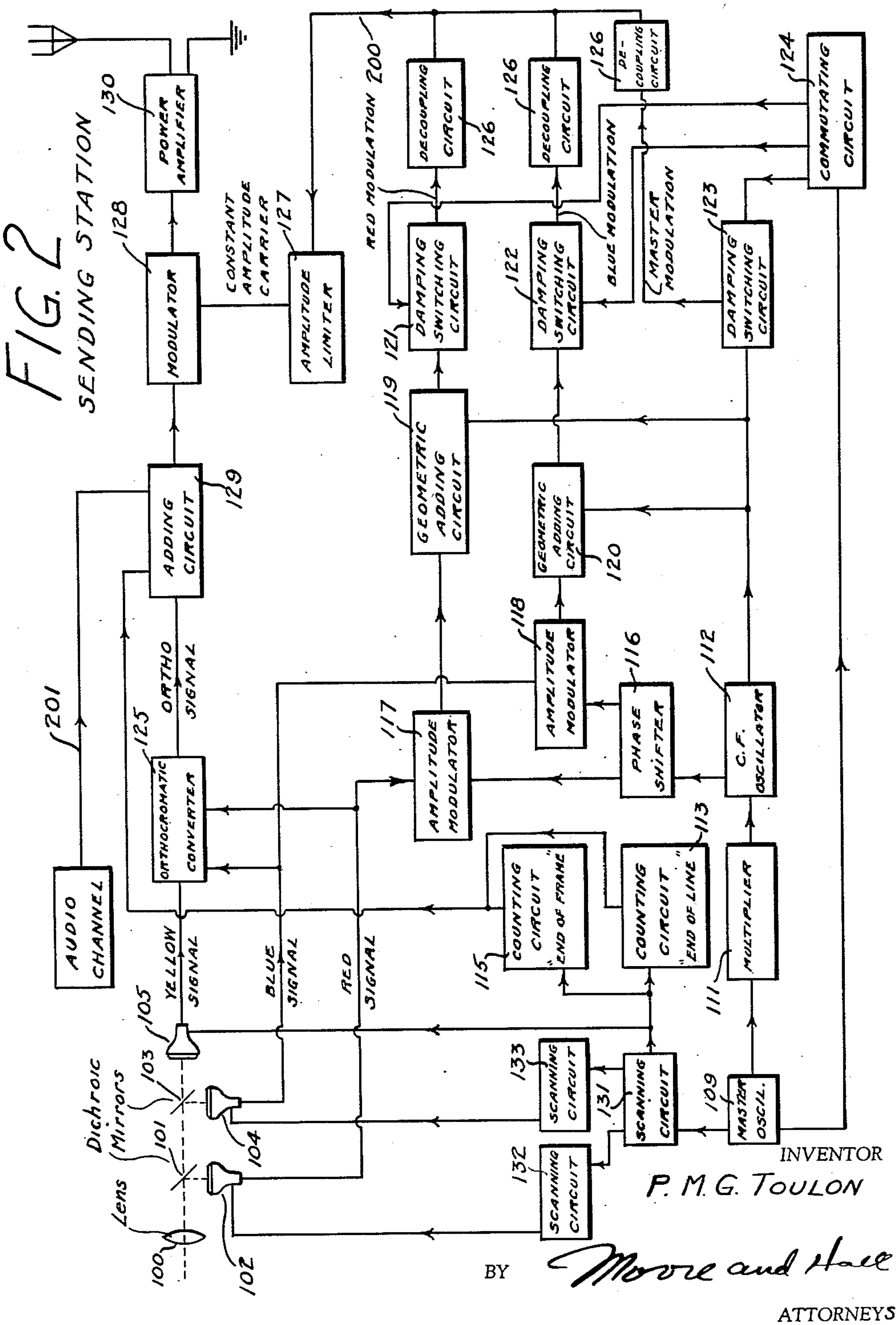

Figure 2 is a block diagram of a sending station circuit arrangement for producing a wave such as that of Figure 1F. Recognizing the form of the wave, it is readily apparent that many other circuit arrangements, differing substantially from that of Figure 2, could effectively be employed to produce the desired wave.

Referring to Figure 2, a lens 100, focused upon the image to be transmitted, in conjunction with dichroic mirrors 101 and 103, produces three independent monochrome images which are placed upon the faces of pick-up tubes 102, 104, and 105. Such a pick-up system is well known in the television art, and the pick up tubes may be standard, such as those known as image orthicons, vidicons, or iconoscopes. For the purposes of this description, it is assumed that mirrors 101 and 103 are so arranged that the red image is placed upon tube 102, the blue image upon tube 104, and the yellow image upon tube 105. A time reference is obtained for operation of the circuit from local oscillator 109 which may be of any type well known in the art capable of generating a stable, accurately determined frequency, such as a crystal controlled oscillator. The output frequency of the oscillator is preferably that of the total number of dots to be scanned per second, and this output is fed to three circuits, multiplier 111 and commutating circuit 124, to be subsequently described, and scanning circuit 131.

Scanning circuit 131 feeds pick up tube 105 thereby providing the sweep voltages required for scanning the yellow image, and the circuit also feeds further scanning circuits 132 and 133 which provide similar sweep voltages for tubes 102 and 104. This arrangement of sweep circuits, and the type of sweep circuits to be employed, are well known in the television art and any appropriate circuit may be here employed. Scanning circuit 131 also synchronizes counting circuits 113 and 115 which, in turn, provide at their outputs respectively "end of line" and "end of frame" pulses. Again, these circuits are in accordance with classical technique, and any well known circuit may be employed. It should further be noted that, if dot interlaced scanning is to be used, scanning circuit 131 may feed a further counting circuit of well known form to provide the "end of color cycle" pulses.

Local oscillator 109 operates at a frequency, for instance, of about 8 mc. The output of oscillator 109 feeds a multiplier circuit 111, of any well known type, wherein the frequency of oscillation is increased to, say, 120 mc. The multiplier 111 in turn synchronizes a carrier frequency oscillator 112 which produces an output of constant amplitude and at a phase angle of 0 degrees with reference to an arbitrarily chosen datum, said output being, once more, at the carrier frequency which is here assumed to be 120 mc. Each of these circuits conform to those well known in the art, the only requirement being that multiplier 111 be designed to step up the dot frequency to the desired carrier frequency.

One of the outputs of carrier frequency oscillator 112 is passed through phase shifting network 116, the two outputs of which are shifted 90 degrees with respect to the reference oscillation of oscillator 112, this shifted wave once more being maintained at constant amplitude and constant 90° phase shift with respect to the datum of the reference oscillation. The phase shifting network is again classical and may take the form of an RL, RC, or RCL network, or of an appropriate reactance tube circuit. The 90 degree shifted outputs are fed to amplitude modulators 117 and 118 placed in the red and blue channels respectively.

Inasmuch as the red channel and blue channel are similar as to circuitry and operation, the description of only the red channel will be given, it being understood that the blue channel is analogous. The output of tube 102 is a variable voltage corresponding to the variations in intensity of the red image placed thereon. This variable red signal is fed to amplitude modulator 117, of classical type, wherein it acts as a modulation voltage to modulate the 90° shifted carrier introduced from phase shifter 116. Thus the output of modulator 117 is a modulated carrier wave, the amplitude of which varies in accordance with variations in the red signal intensity.

Geometrical adding circuit 119 is fed by the output of carrier frequency oscillator 112, which is of constant amplitude and zero phase, and by the output of amplitude modulator 117, which is of varying amplitude (in accordance with the intensity of red signal) and 90 degree phase. As may be readily seen by simple vectors, the addition of a constant vector at 0 degrees and a varying vector at 90 degrees will give a resultant vector of varying magnitude and varying phase shift with respect to the 0 degree vector. Thus the output of adding circuit 119 will vary in phase in accordance with the variations in intensity of the red signal. This system of obtaining a phase shifted wave by geometrical addition is fully described in United States patent to Toulon, No. 1,654,951, issued on January 3, 1928. The output of adding circuit 119 is ordinarily followed by a classical limiter circuit (not shown) whereby the amplitude variation of the resulant vector will be eliminated, the output of adding circuit 119 thereby only varying in phase in accordance with the intensity of the red signal.

By analogy, the output of adding circuit 120 varies in phase, with respect to the reference oscillation, in accordance with the varying intensity of the blue image on tube 104. In addition to the circuits here shown, auxiliary circuits may be provided in connection with each of the adding circuits 119 and 120 to maintain the outputs of each of these circuits at a constant value of phase shift during the time of one dot.

The red and blue phase shifted signals are switched into the output channel 200 at appropriate times. This switching is accomplished through the medium of damping-switching circuit 123 which is in the reference oscillation channel for placing the reference oscillation in the output at the appropriate time, by damping-switching circuit 121 which then places the phase shifted red oscillation in the output, and by damping-switching circuit 122 which then places the phase shifted blue oscillation in the output. Each of damping switching circuits 121, 122, and 123, is controlled by the output of a commutating circuit 124, this commutating circuit insuring that only the proper signal is placed in the output channel at the proper time.

Figure 3:
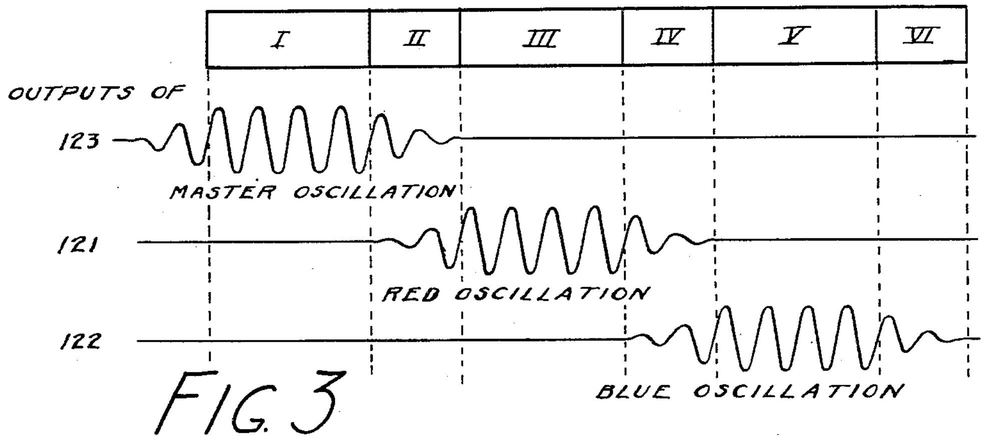

The outputs of the three damping-switching circuits are as shown in Figure 3. The operation of the circuits is such that circuit 123 allows the reference oscillation to be introduced to channel 200 during a period I, and then damps this oscillation during a period II. During the same period II, damping-switching circuit 121 is allowing the red oscillation, properly phase shifted, to build up in the output channel 200, maintains the red oscillation in the output channel during a period III, and causes the red oscillation to be damped during a period IV. Similarly, damping-switching circuit 122 permits the blue oscillation, also properly phase shifted, to build up during the same period IV, maintains the blue oscillation in the output channel during a period V, and then damps the oscillation during a period VI. Each of the damping-switching circuits is followed by a decoupling circuit, 126, of classical type, to prevent any interaction of the respective outputs. As may readily be seen from Figure 3, during time periods I, III, and V, oscillations of substantially constant amplitude, and of constant frequency F, the carrier frequency, appear in the output channel. During periods II, IV, and VI, the oscillation appearing in the output channel is of a variable frequency, and is the resultant of the addition of two oscillations phase shifted with respect to one another. This summation output which appears in channel 200 is passed through an amplitude limiter 127 once more of well known structure, and the output of limiter 127 is, as shown in Figure 1B, a carrier wave of very constant amplitude, but phase-shift modulated at periodic intervals of time.

Figure 4A:
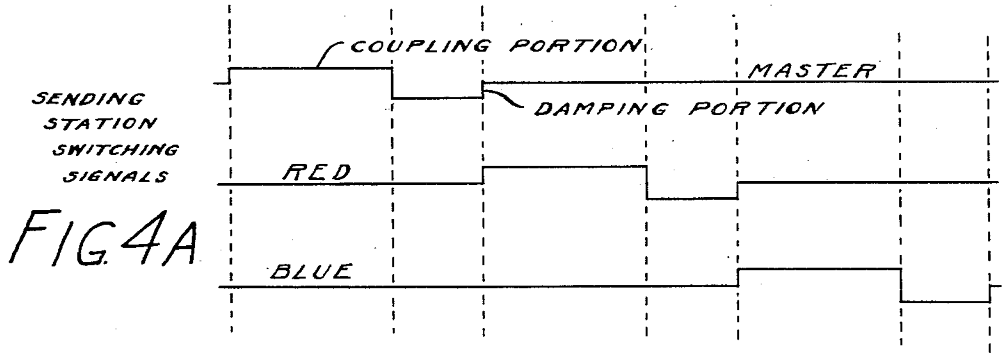
Figure 5A:
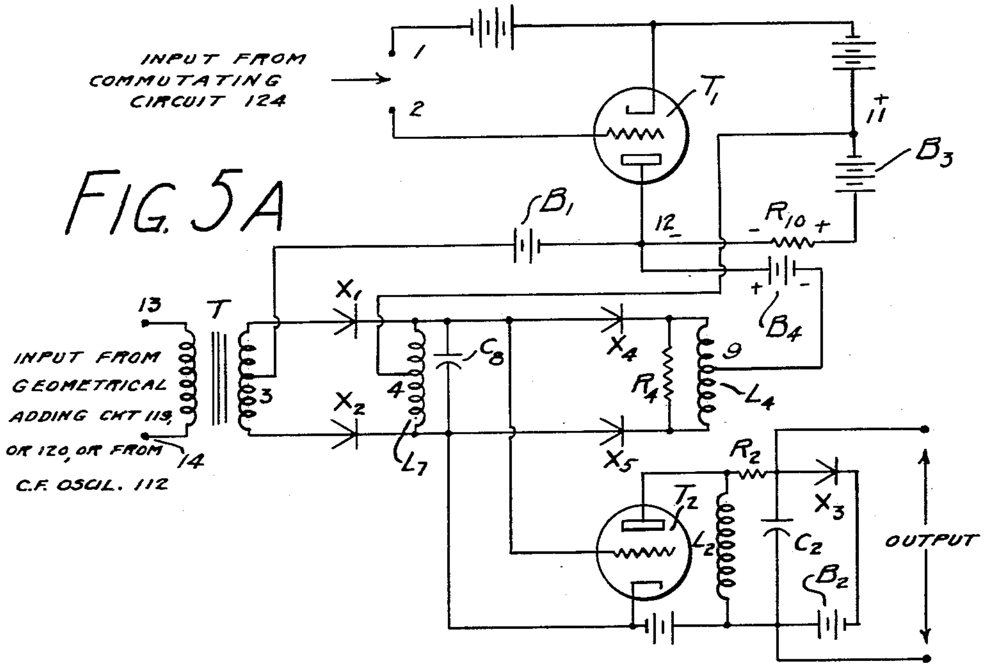

In describing the operation of the commutating circuit 124, and of the switching-damping circuits 121, 122, and 123, reference is made to Figure 4A and to Figure 5A. Commutating circuit 124 is controlled by the output of local oscillator 109. The output of the commutating circuit is represented by Figure 4A, this output comprising three separate trains of pulses, accurately timed with respect to one another, each train consisting of one positive, or coupling position, followed by one negative, or damping portion per dot. There therefore appears during each of periods I, III, and V, a coupling signal, these coupling signals being so timed that, during period I it is fed to the reference oscillation damping-switching circuit 123, during the period III it is fed to the red oscillation damping-switching circuit 121, and during the period V it is fed to the blue oscillation damping-switching circuit 122. Moreover, each of the coupling portions of the wave is followed by a damping portion, in the periods II, IV, and VI so that the oscillation introduced to the output channel 200 may be damped in time to allow the introduction of the next oscillation to said output channel. Any appropriate circuitry may be employed to obtain the switching signals shown in Figure 4A; in particular such circuits are described in my copending United States Application Serial No. 85,906, filed April 6, 1949, Patent 2,568,375 for "Process Permitting the Engendering of Tension Impulses Graduated in Time, Accompanied by Applications of This Process to Distribution."

The switching signals shown in Figure 4A are fed respectively to damping-switching circuits 121, 122, and 123. Each of these circuits are of the structure shown in Figure 5A, and a description of the operation of the damping switching circuit is as follows, referring to said Figure 5A:

Tube $T_1$ has, ordinarily, a steady state current flowing therethrough in the absence of any signal applied to the grid. This steady state, no-signal current is, for example, approximately 10 m. a., and causes a potential drop across resistor $R_{10}$ which is of substantially the same value as that of battery $B_3$. Inasmuch as battery $B_3$ is in voltage opposition to the drop across $R_{10}$, the potential difference between points 11 and 12 is substantially 0 for no signal input.

Point 12 is connected, through a battery $B_1$ to the center tap 3 of the secondary of a transformer T. The primary 13—14 of transformer T is connected to the output of geometrical adding circuit 119 or 120, or to the output of carrier frequency oscillator 112, depending upon which damping-switching circuit is being considered. Point 11 is connected to the center tap 4 of an inductance $L_7$, the inductance $L_7$ being connected across the secondary of transformer T through rectifiers $X_1$ and $X_2$. The value of battery $B_1$ is so chosen that its magnitude exceeds that of any signal which may appear on the secondary of transformer T. Inasmuch as, for the state of no-signal input to tube $T_1$, the potential difference between points 11 and 12 is 0, the potential difference between points 3 and 4 is that of battery $B_1$. Connected across inductance $L_7$ is a capacitor $C_8$, the combination forming a tank circuit resonant at the carrier frequency F. In the absence of a signal to tube $T_1$, the potential difference across 3—4 and in turn across each of rectifiers $X_1$ and $X_2$, is greater than the maximum signal appearing across transformer T; inasmuch as the rectifiers $X_1$, $X_2$, cannot conduct under such circumstances, no energy can pass from transformer T to tank circuit $L_7$—$C_8$ and there will be no output from the damping switching circuit.

Points 1—2 are connected to the proper output of commutating circuit 124 and, through a biassing battery, to the grid and cathode of tube $T_1$. When a positive pulse, comprising the coupling portion of the proper switching signal (Figure 4A), appears at points 1—2 and on the grid of tube $T_1$, the tube begins to conduct a greater current, for instance 20 m. a., and the potential drop across resistance $R_{10}$ increases to equal that of the added potentials of batteries $B_1$ and $B_3$. The potential difference between points 3—4 therefore becomes equal to zero, and signals present on transformer T pass to tank $L_7$—$C_8$ through rectifiers $X_1$ and $X_2$ which now conduct in double rectification. During this coupling time portion, therefore tank $L_7$—$C_8$ oscillates at frequency F and in phase with the input signal at 13—14. The output of tank $L_7$—$C_8$ is passed through a limiter comprising tube $T_2$, tank $L_2$—$C_2$ which is partially damped by resistance $R_2$, and rectifier-battery network $X_3$—$B_2$. As may readily be seen, rectifier $X_3$ will conduct when the maximum amplitude of signal in tank $L_2$—$C_2$ exceeds the magnitude of battery $B_2$, and thereby short-circuit the output of the tank. The output of the entire circuit is thus limited to the value of battery $B_2$. Connected across tank $L_7$—$C_8$, through rectifiers $X_4$, $X_5$, is a further network of a resistor $R_4$ and an inductance $L_4$ in parallel. The center point 4 of inductance $L_4$ is connected to point 12, the plate of tube $T_1$, through a battery $B_4$. As is apparent from the foregoing discussion, when tube $T_1$, is in its no-signal state, the potential between point 4 and 9 is that of battery $B_4$. The magnitude of the battery $B_4$ is again selected to be greater than the maximum signal in transformer T. Since rectifiers $X_4$, $X_5$, cannot conduct when the potential across them is that of battery $B_4$, the network of resistor $R_4$ and inductance $L_4$ is effectively out of the circuit when there is no signal input to tube $T_1$.

Again, when a positive pulse is placed on the grid of tube $T_1$, $R_4$ is still effectively out of the circuit. Under this positive pulse input state, a greater current flowing through resistor $R_{10}$, point 12 becomes negative to point 11, and the potential between points 4 and 9 becomes even higher. Therefore, for both the no-signal, and positive-signal states, resistor $R_4$ is not in the circuit for all practical purposes.

However, when the negative, or damping, pulse comes into points 1—2, the current through tube $T_1$ drops to about zero. Although no signal can now pass from transformer T to tank $L_7$—$C_8$ (since the potential between points 3 and 4 is now about $B_1$ plus $B_3$), tank $L_7$—$C_8$ would ordinarily continue to oscillate for a relatively substantial time at the frequency F, since the only damping of this circuit is ordinarily caused only by the inherent resistance of the tank components. However, the present circuit arrangement causes the tank $L_7$—$C_8$ to be very quickly damped when the negative damping pulse is placed on the grid of tube $T_1$. Under such circumstances, the current of tube $T_1$ having dropped to 0, point 11 becomes negative to point 12 by the value of battery $B_3$. Since batteries $B_3$ and $B_4$ oppose one another, and further since the magnitudes of batteries $B_3$ and $B_4$ are chosen to be about the same, the potential between points 4 and 9 becomes about 0 for the damping pulse state. The resistor $R_4$ is thus effectively placed across tank $L_7$—$C_8$, and very rapidly damps any oscillations present therein. The overall effect of the circuit of Figure 5A is, therefore, in response to the commutating signal of commutator 124, to pass oscillations from the proper adding circuit or carrier frequency oscillator to the output channel 200 during time periods I, III, or V, and to damp the oscillations during periods II, IV, or VI immediately following each introduction. The outputs of damping switching circuits 121, 122, and 123 are therefore properly as represented in Figure 3. The oscillations in channel 200, after having passed through amplitude limiter 127, therefore form a constant amplitude carrier as shown in Figure 1B, and this carrier is fed to an amplitude modulator 128.

As has been shown in Figures 1E and 1F, the carrier fed to modulator 128 can be amplitude modulated by the yellow signal alone. However, in order to obtain a high fidelity picture when the transmitted wave is received by a black and white receiver, the picture should not depend on the yellow signal alone, but should contain, in part at least, the blue and red information. Such a signal, which is basically yellow but is modified by the blue and red signals, is known as an "orthochromatic" signal. It is obtained by superimposing upon or adding to the yellow signal predetermined proportions of the blue and red information. The reception of such an orthochromatic signal in a black and white receiver avoids the appearance of the "dot effect" normally present if the subject being televised is a monochrome.

The orthochromatic signal is obtained as shown in Figure 2, by tapping off predetermined proportions of the outputs of red and blue pick-up tubes 102 and 104. These signals are fed to an "orthochromatic converter" which is no more than an attenuator placed in each of the blue and red channels and adjusted to pass only the desired proportion of these signals, and a classical adding circuit or integrator which combines the proportions of blue and red signals with the yellow signal output of tube 105. No circuit diagram is shown for 125 since a myriad of networks can be used to effect the orthochromatic conversion, the simplest of which would be, as above described, the attenuator feeding an integrator, each of which is well known in the art. It must be emphasized, however, that while an orthochromatic signal will certainly improve the picture fidelity, such a signal is not essential to the present invention; the carrier can be modulated by the yellow signal alone, in addition to other information which will be next described.

The output of orthochromatic converter 125, or of pick up tube 105 when the yellow signal alone is to be transmitted, is fed to a classical adding circuit 129. The "end of frame" pulse output of counting circuit 115 and the "end of line" pulse output of counting circuit 113 (as well as the "end of color cycle" pulses where such are used) are also fed to adding circuit 129 where these pulses are superimposed, in well known manner, on the video signal (here, the orthochromatic signal). In addition to these signals, the audio signals of a classical audio channel 201 are fed to the net work 129, these signals eventually appearing, in conformity with usual procedure, in the side bands of the carrier. In those cases where the transmission of the audio signal is to be effected through the medium of a sub-carrier which is at a frequency higher than the highest frequency of the television transmission (higher than half the dot frequency), the audio signal can be used to amplitude modulate the sub-carrier, and the amplitude modulated sub-carrier can then be used to modulate the constant amplitude carrier.

The output of adding circuit 129, which contains as a varying amplitude signal the orthochromatic, audio "end of line," and "end of frame" signals, is fed to modulator 128, of any appropriate structure, and there amplitude modulates the constant amplitude carrier output of limiter 127, the output of modulator 128 then being an amplitude modulated sequentially phase shifted carrier wave. This wave is them amplified in a power amplifier 130, which is preferably a feed-back amplifier to maintain the amplitude proportionality and phase shift relations, and is thence emitted by a radiating antenna.

Figure 6:
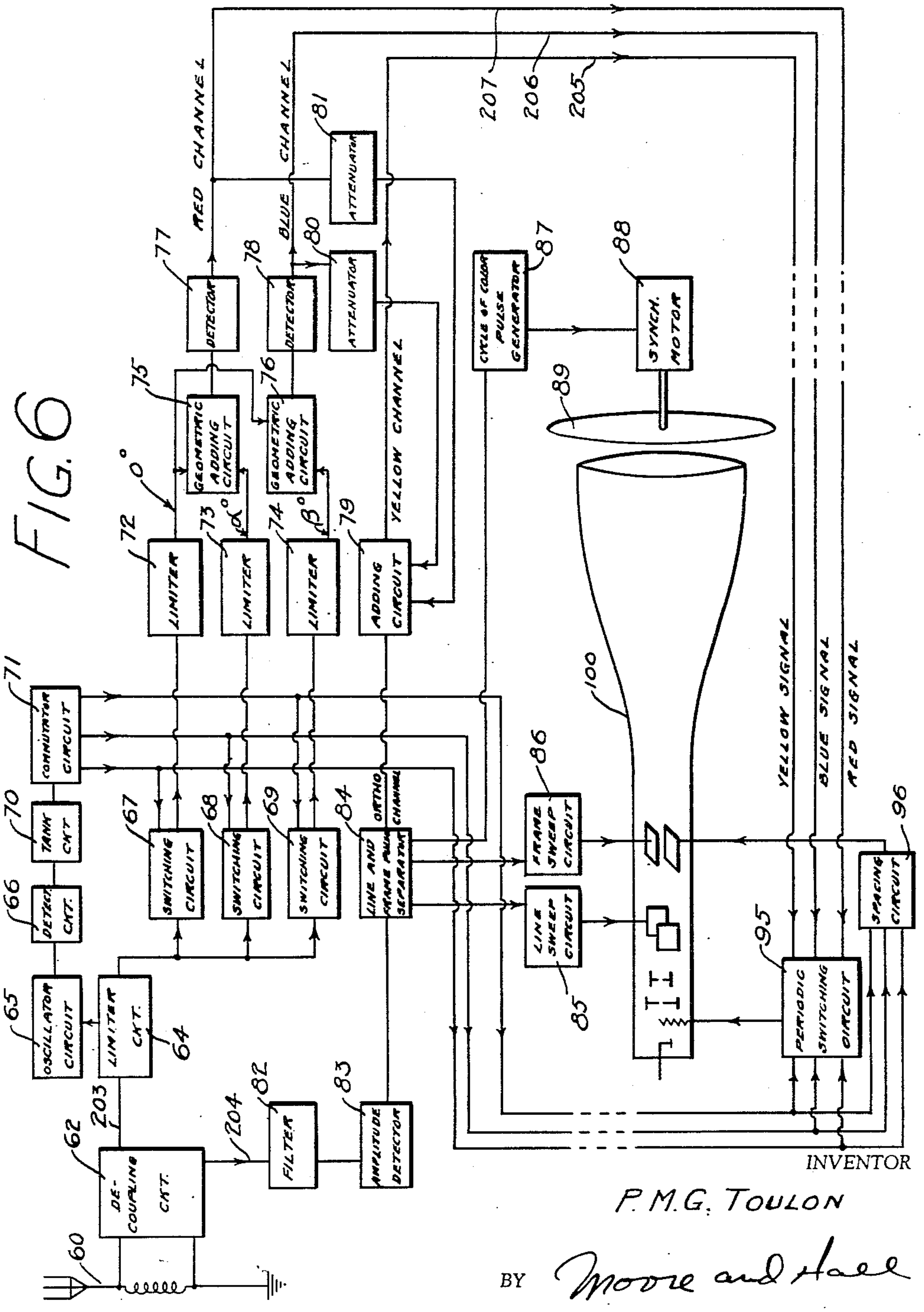
Figure 6 is a schematic diagram of a color television receiving station employed in accordance with this invention.

Having thus described the production of the desired wave, reference is now made to Figure 6 wherein such a wave may be detected. It should first be pointed out that it is well known that a frequency modulated wave frequently has an influence on classical "amplitude" receivers, especially if the normal frequency of the receiver's oscillator circuits is higher or lower than the FM middle frequency. This influence is very small if opposing variations in frequency are made at a high repetition rate, as is the case in my new process. Moreover, this influence is negligible if the frequency excursion is small, and if the band width of the receiver is relatively large. Such is ordinarily the case in the usual video receiver of the present day where any amplitude variations of the frequency modulated wave are eliminated through the use of limiter circuits.

It is further important to note that the present form of "constant" frequency, step by step modulation is absolutely different from a process which employs successively a certain number of discrete, different frequencies. Under the latter theory of transmission, a different frequency would be radiated for each different value of video intelligence to be sent. Such a process of "variable frequencies" transmission can give an appreciable interference in the tuned circuits of an ordinary "amplitude" black and white receiver. The new process of transmission disclosed herein is not subject to these disadvantages inasmuch as the frequency of transmission is substantially constant, and because any variations in frequency are small variations, occur at a high rate of repetition, and are consecutively of two opposite senses. The presently disclosed wave is subject to distortion if used in long distance transmission. However, the process herein disclosed is readily feasible if the power of the sending station is relatively heavy, if the level of parasitic oscillations is low, and if the distances of transmission are relatively short. These last requirements are readily found in present day television installations where the actual sending stations are required to serve a relatively limited area of receivers, that is, receivers within line-of-sight transmission.

Referring now to Figure 6, the transmitted wave, of the form shown in Figure 1F, is picked up by a receiving antenna 60 and coupled to a decoupling circuit 62. From this decoupling circuit, the input signal is fed to two independent channels 203 and 204. The signal in channel 204 is first passed through a filter 82 of the usual "channel-selection" type, this filter having a band width which is relatively large in comparison to the variations in carrier frequency so that the amplitude of the received signal in channel 204 is not affected by these frequency variations. The remainder of channel 204 constitutes the usual construction of a black and white television receiver. The signal is detected in the usual amplitude detector 83, and is passed through a line and frame pulse separator 84, the output of which in turn controls line sweep circuit 85 and frame sweep circuit 86 which are coupled to deflection electrodes of picture tube 100. If the signal is received by a black and white receiver, the foregoing circuits would be, basically, the only ones required, the detected orthochromatic signal being coupled to the intensity electrode of the picture tube to thereby produce, in cooperation with the aforementioned sweep circuits, the black and white picture. Inasmuch as any standard AM video receiver circuit may be incorporated in channel 204, no discussion of these circuits will be given.

The present system of transmission may be used with any system of color interpretation, such as a color disc, a multi-gun picture tube, or a single gun tube using electronic lens focalization. The receiver being discussed in reference to Figure 6 is basically concerned only with the obtaining of three signals representing respectively the red intensity, blue intensity, and yellow intensity of a dot or dots. These signals appear in three output channels 207, 206, and 205 respectively, and the signals there appearing may be used in any system of interpretation.

For instance, if a picture tube is employed which employs three independent electron guns for the color interpretation, each of the guns would be actuated by the output signal in one of channels 205, 206, or 207. If electronic lens focalization is used, an electronic commutator would be provided, synchronized to a third of the dot frequency, to apply successive potentials to the control grid of the picture tutbe, whereby the electron beam is directed through a hole in a perforated plate to different sites of a fluorescent screen where, for example, different color phosphorescents may be deposited.

Figure 6 has been designed to illustrate the application of the present invention to a system such as is described in my copending application Serial No. 163,285, filed May 20, 1950, for "Television Systems." In this case, an "end of color cycle" pulse would also be transmitted and would, after being separated in separator 84, actuate a cycle of color pulse generator 87 which in turn controls a synchronous motor 88 driving a color disc 89. The three signals appearing in output channels 205, 206, and 207 would be successively placed on the grid of the picture tube 100 through the medium of a periodic switching circuit 95 which is, in turn, controlled in time by the output of a commutator circuit 71. The output of the commutating circuit also controls a spacing circuit 96 whereby the potential on one of the deflection plates is changed successively in three distinct steps. Consequently, three different parts of the screen are successively scanned at a very high speed; the turning disc 89 rotates at a comparatively low speed, the result being the apparently simultaneous scanning of three different portions of the screen, corresponding to the three monochromes. Because the three scannings are operating at a relatively great distance from one another, it is easy to move the three monochrome filters across the different portions of the picture face. Although the drive and disc here illustrated can readily be used in this system, other systems such as a colored line moving screen or checker board color oscillating screen can also be used even more practicably.

When the system of the present invention is used in color television reception, if the transmitted amplitude modulation was in the form of an orthochromatic signal, the signal should be reconverted to a pure yellow signal, inasmuch as, in the color receiver, it is used in cooperation with the blue and red signals in producing the picture. For this purpose attenuators 80 and 81 tap off predetermined proportions of the signals appearing in red output channel 207 and blue output channel 206 (the same proportions being used here as were used at the sending station) and subtract these proportions from the orthochromatic signal output of detector 83 in an integrator or adding circuit 79 of well known structure; the output of this circuit 79 appears in channel 205 and constitutes the pure yellow signal. Thus the incoming signal, in passing through channel 204 has been reinterpreted as the yellow signal.

The incoming signal also passes through another channel 203 wherein the red and blue signals are derived. It is to be emphasized once more than only channel 204 would be present if the transmitted signal were to be received by a black and white receiver. In the color receiver disclosed in Figure 6, the incoming signal is first applied to a decoupling circuit 62. This circuit has been shown, in Figure 7, as two thermionic valves, $T_3$ and $T_4$, having parallel connected cathodes and grids coupled to the antenna. The two channels 203 and 204 are fed respectively from the separate plate circuits of tubes $T_3$ and $T_4$, and shield means are provided in different parts of the physical circuit to prevent undesirable interaction of the two channels. Tube $T_4$ is representative of a classical proportional amplifier, while tube $T_3$, in combination with tank $L_{10}$—$C_{10}$, rectifier $X_{10}$, and battery $B_{10}$, forms a saturation or limiter circuit of accurate effect. As has been described in connection with Figure 5A, the output of limiter circuit 64 ($L_{10}$—$C_{10}$—$B_{10}$—$X_{10}$) is limited to the magnitude of battery $B_{10}$. The output of limiter circuit 64 is coupled to damping-switching circuits 67, 68, and 69.

Figure 7:
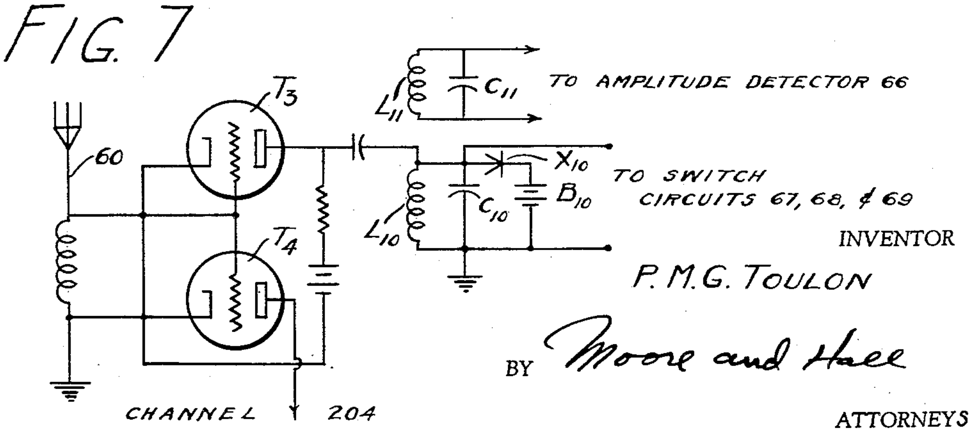
Figure 7 is a circuit diagram of a portion of said receiving station.
Figures 8A, 8B, 8C, 8D, 8E:
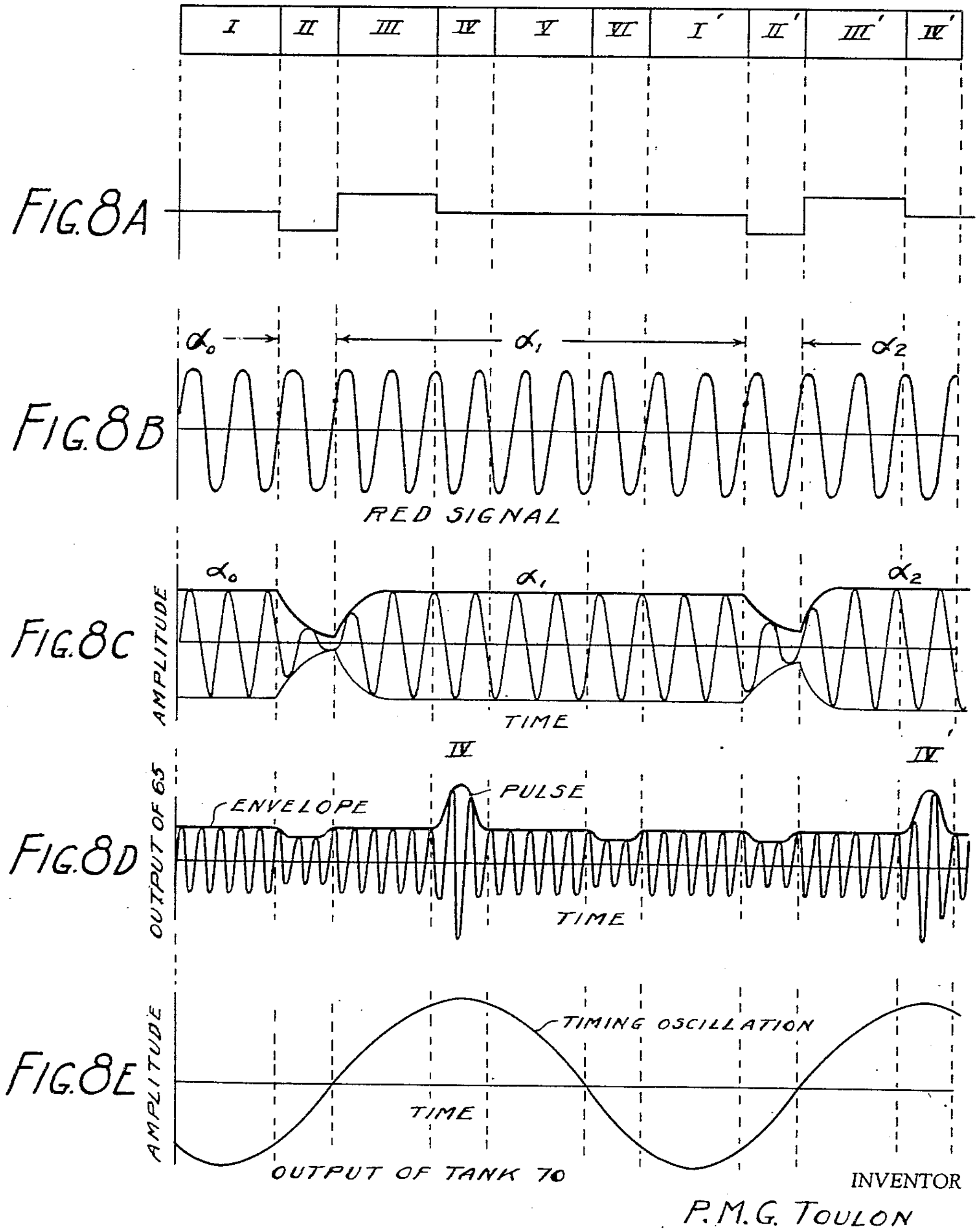

The oscillations in tank circuit $L_{10}$—$C_{10}$ are coupled, for instance magnetically, to an oscillator circuit 65, represented in Figure 7 as tank $L_{11}$—$C_{11}$. Tank $L_{10}$—$C_{10}$ is tuned to the frequency F and the output is sufficiently limited so that it appears as Figure 1B. Tank $L_{11}$—$C_{11}$, however, is tuned to a frequency higher than F, and the output is not limited. Referring to Figure 8D, it is seen that the output of tank $L_{11}$—$C_{11}$ has, therefore, one maximum per dot. During the periods I, III, and V, the frequency being F, the output of tank $L_{11}$—$C_{11}$ is at a first amplitude. During periods II and VI, the frequency being lower than F, the output of tank $L_{11}$—$C_{11}$ is at a second, lower, amplitude. During the period IV, however, when the frequency is higher than F, the output of tank $L_{11}$—$C_{11}$ increases in amplitude. The output of oscillator circuit 65 is detected, by usual techniques, in detector 66, the output being that designated as "envelope" in Figure 8D, and comprising a single pulse per dot. This pulse output of detector 66 is then fed to a tank circuit 70, tuned to the dot frequency, the output of tank 70 being, as shown in Figure 8E, a timing oscillation or reference commutation frequency at the dot frequency, the amplitude of the timing oscillation being, preferably, maintained at a constant amplitude by a proper limiter device.

The time oscillation or reference commutation frequency is fed to a commutator circuit 71 which produces an output comprising three rectangular signals, phase shifted from one another by 120 degrees. The circuit 71 is similar to that of the transmitter commutator circuit 124, and may, once more be of the type described in copending application Serial No. 85,906, supra. These circuits may also take the form wherein a potentiometer is used for the central signal, a resistor in series with an inductance is used to obtain the retarded phase shift signal, and a resistor in series with a capacitor is used to obtain the advanced phase shift signal. The three phase shifted signals, which are sinusoidal in form, are transformed into rectangular signals through appropriately biased rectifiers, and amplitude limiting resistances.

Figure 4B:
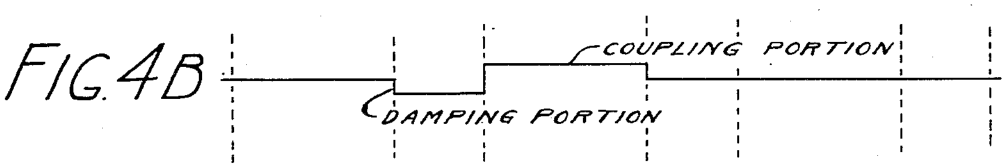

The three phase shifted signals appearing in the output of commutator circuit 71 are each of accurate amplitude, and each is of the form shown in Figures 4B and 8A, each of these figures representing the coupling signal for the red information portion of the incoming wave. The output of circuit 71 is, basically, the same as that of circuit 124, in that each train of wave comprises both positive, coupling, portions and negative, damping, portions. However, while at the sending station the damping portion immediately follows each coupling portion in time, at the receiving station each damping portion immediately precedes the coupling portion in time. The function of this latter waveform is more fully described later, but the difference in the waveforms is, briefly, for the following reason: At the sending station, the damping portion is used to rapidly decrease the amplitude of a given signal in the output channel, in order that the next signal, representing information for the same dot cycle, but for a different portion of that cycle may be introduced to the output channel without interference, i. e. The reference is damped to allow introduction of the red signal, which is, in turn, damped to allow introduction of the blue signal. At the receiving station, the damping portion is used to decrease the amplitude of a color information portion of a first dot cycle in time to allow the introduction of the same color information of the next dot cycle with a minimum of interference, i. e. a first red signal, which may be at a phase shift of alpha 1, is damped in time to permit the next red signal, for instance at a phase shift of alpha 2, to be introduced. In effect, therefore, the damping portion at the sending station permits a given color oscillation to exist for substantially only ⅙ of the output dot cycle, while, at the receiving station, the damping portion allows a given color oscillation to exist over the entire period of one dot, except for a very short period of time during which the color intensity information of one dot cycle is superseded by the same color intensity information of the next dot cycle.

The output potentials of commutator circuit 71 are fed to three damping switching circuits 67, 68, and 69, which are each, as previously mentioned, also fed by the output wave of limiter circuit 64. Switching damping circuits 68 and 69 are each of the same configuration as the circuit of Figure 5A, and the operation of these circuits is the same as that previously described. The damping portions of the commutator wave are so arranged, however, that, each of the switching circuits 68 and 69 produces an output for a period of time substantially equal to that of each dot. For instance, referring to Figures 8A, 8B, and 8C, no energy is coupled to the output of circuit 68 (in the red channel) until a coupling portion occurs. When such a coupling pulse occurs, for instance in the period III for the red oscillation, the oscillatory output of circuit 68 increases to its maximum very quickly (Figure 8C) and continues oscillating at the phase angle alpha 1, which is present at the input of circuit 68 at the time of the coupling pulse and corresponds to the intensity of red signal for that dot cycle. The output of circuit 68 is damped very slowly over the period of the complete dot because of the inherent resistance of the tank, but this decrease in amplitude being relatively slight, a limiter circuit 23 following the damping-switching circuit 68 (or limiters 72 and 74 following circuits 67 and 69) maintains the level substantially constant. The next dot cycle of information commences at a period I′, but inasmuch as the next coupling pulse isn't fed to circuit 68 until the period III′, the output of circuit 68 will continue to be at the phase angle alpha 1, corresponding to the red information in the first dot cycle. During the period II′ of the second dot cycle, a damping pulse is fed to damping-switching circuit 68, with the result that oscillations at the phase angle alpha 1 are very quickly damped. Then, during the period III′, at which time the second dot cycle red information at phase angle alpha 2 is being applied to the input of circuit 68, a coupling signal is fed to the circuit 68, and the output of the circuit builds up very rapidly at the phase angle alpha 2. It is preferable that the rapidly damped portions of the wave, for instance II, II′, etc. for the red information, do not decrease the wave amplitude to 0. This can be effected in a plurality of ways, for instance by proper choice of the damping resistor in the switching-damping circuit.

Figure 8C illustrates the build up-sustain-damp waveform for each of three successive dot cycles, the red information in the cycles being respectively at phase angles of alpha 0, alpha 1, and alpha 2. Figure 8B illustrates, diagrammatically, the phase shifts from alpha 0, to alpha 1, to alpha 2. Thus, it may be seen that the output of switching circuit 68 is a sequency of oscillations at the frequency F, each member of the sequence being at a given phase angle and being sustained for substantially an entire dot period. Similarly, the output of switching circuit 69 and limiter 74 is a similar sequence at phase angles beta 0, beta 1, beta 2, etc. corresponding to the blue informations present in successively received dot cycles.

Figure 5B:
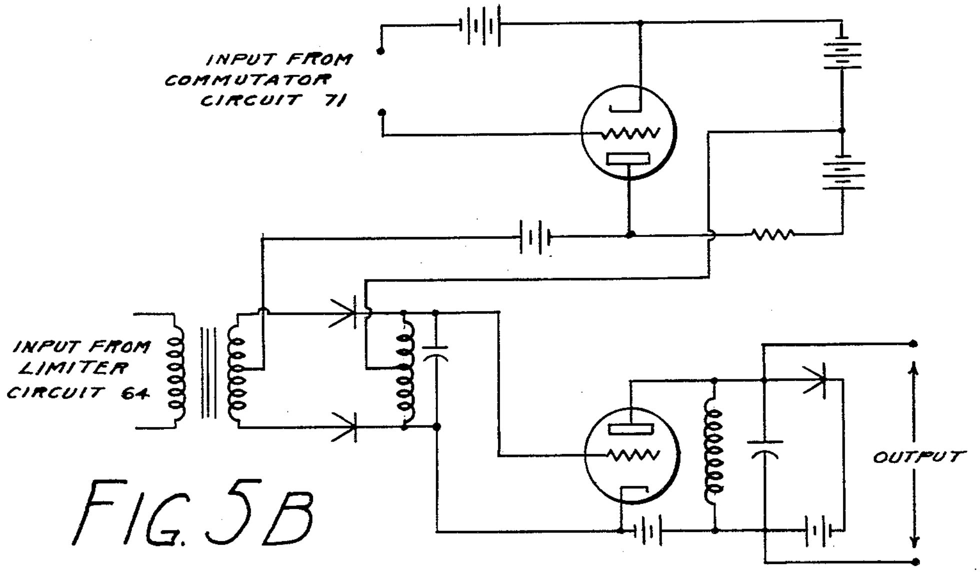

Inasmuch as the wave input to circuit 67 is always at a phase angle of 0 degrees, no damping is required in this circuit, as is required in circuits 68 and 69. The switching pulses may be merely positive, coupling, pulses, or they may be of the same positive-negative form as those applied to circuits 68 and 69, the negative pulse being ineffective. Switching circuit 67 is as shown in Figure 5B. Comparing Figure 5B to Figure 5A, it will be readily seen that the circuits are identical except that the former has omitted the "damping" portion of the circuit: rectifiers $X_4$, $X_5$, resistor $R_4$, inductance $L_4$, and battery $B_4$. Thus the operation of the circuit 67, Figure 5B, is exactly as has been described in reference to the no-signal and positive-signal states of input to the circuit of Figure 5A, any negative signal input being ineffective to change the output of the circuit. In effect, therefor, the reference oscillation portion of each incoming wave is passed through the switching circuit 67, the result being that the output of limiter 67 is a sustained wave of oscillations, always at the frequency F, and always at a phase angle of 0 degrees. The result of the foregoing process has been indicated in Figure 6, the output of the limiter 72 being at 0 degrees, the output of limiter 73 being at alpha degrees, and the output of limiter 74 being at beta degrees, for a given dot cycle.

The outputs of limiter circuits 72 and 73 are combined in a geometrical adding circuit 75, while the outputs of limiters 72 and 74 are combined in a further geometrical adding circuit 76, this combining being analogous to that described in my United States Patent No. 1,654,951, supra. The amplitude of the output of each of the limiter circuits is the same. Therefore the amplitude of the output of each of adding circuits 75 and 76 is dependent solely upon the phase difference between the waves being added or, since one of the waves being added in each of the circuits is at 0 degrees, the output amplitude of each of the adding circuits is dependent solely upon the phase angle of the red or blue signal being added. Once more, this is readily to be seen from simple vectors. If the two waves being added are in phase, since they are each of the same amplitude the resultant of the two will be twice the magnitude of each. As the phase difference between the two waves being added increases, the amplitude of the resultant decreases until, at 90° phase shift, it is only 1.414 the magnitude of each.

The output of adding circuit 75 is passed through an amplitude detector 77 wherein the carrier is eliminated and only the amplitude of red signal remains. Similarly the output of adding circuit 76 is detected in detector 78, leaving the blue signal amplitude only. Thus, the foregoing process produces, in output channel 207, a potential whose amplitude varies in accordance with the phase shift of the red signal, while in output channel 206, there appears a potential varying in amplitude in accordance with the phase shift of the blue signal. When these two signals are taken in combination with the yellow signal appearing in channel 205, there appears, on the three output lines 205, 206, and 207, three signals varying in intensity in accordance with the intensity of the corresponding colors of dot surfaces of the transmitted image.

Having thus described by invention, I wish it to be understood that the foregoing description is not intended to limit the scope of my invention to any particular circuitry of sending or transmitting station. Many other arrangements will readily suggest themselves whereby the sequentially phase shifted wave and the amplitude modulated sequentially phase shifted wave may be produced. For instance, the circuitry employed may use well known electronic switching circuits synchronized by a stable line frequency, other forms of damping being used which are also stabilized by the line frequency and inserted in the respective channels at sending and receiving station at the proper relative times. Moreover, the orthochromatic principle of operation may be eliminated if desired. Other circuit modifications may be readily seen.

I claim to have invented:

1. Apparatus for producing an oscillatory potential carrying a plurality of informations thereon comprising first oscillator means producing a first constant frequency oscillating potential at a first phase angle, second oscillator means producing a second oscillating potential at the same constant frequency and including means variably shifting the phase of said second oscillating potential from said first phase angle in response to the magnitude of a first information, third oscillator means producing a third oscillating potential at the same constant frequency and including means variably shifting the phase of said third oscillating potential from said first phase angle in response to the magnitude of a second information, an output channel, switching means coupled to the outputs of each of said oscillator means and to said output channel for successively placing said first, second, and third oscillating potentials in said output channel each for a fixed period of time, said switching means including damping means, whereby said switching means places a given oscillating potential in said output channel for a first period of time and said damping means then reducing the amplitude of said oscillating potential during a successive period of time, pulse generator means producing a train of positive and negative pulses and coupled to said switching and damping means, said switching means being responsive to pulses of one sense and passing oscillating potentials to said output channel in response to the occurrence of pulses of said one sense, and said damping means being responsive to pulses of the other sense and reducing the amplitude of oscillating potential passing through said switching means in response to the occurrence of pulses of said other sense.

2. Apparatus for producing an oscillatory potential carrying a plurality of informations thereon comprising first oscillator means producing a first constant frequency oscillating potential at a first phase angle, second oscillator means producing a second oscillating potential at the same constant frequency and including means shifting the phase of said second oscillating potential from said first phase angle in response to the magnitude of a first information, third oscillator means producing a third oscillating potential at the same constant frequency and including means shifting the phase of said third oscillating potential from said first phase angle in response to the magnitude of a second information, an output channel, switching means coupled to the outputs of each of said oscillator means and to said output channel, said switching means successively placing said first, second, and third oscillating potentials in said output channel each for a fixed period of time, and modulator means coupled to said output channel for varying the amplitude of the oscillating potentials in said output channel in response to the magnitude of a third information.

3. Apparatus for the transmission of a plurality of informations comprising a sending station radiating an oscillatory wave of potential, said wave comprising a first constant frequency oscillating potential at a fixed reference phase angle, and a second oscillating potential at the said same constant frequency and at an information phase angle shifted from said reference phase angle in response to the magnitude of a first information being transmitted, the amplitude of said radiated oscillatory wave of potential varying in response to the magnitude of a second information being transmitted; and a receiving station sensitive to said oscillatory wave of potential, said receiving station including two independent channels, decoupling means feeding said received potential wave to each of said channels, one of said channels including means responsive only to variations in amplitude of said oscillatory wave of potential, and the other of said channels including comparison means, switching means coupled to said comparison means and selectively coupling said first and second oscillating potentials to said comparison means, said comparison means including means producing an output potential the magnitude of which varies with variations in the phase difference between said information phase angle and said reference phase angle.

4. Apparatus for producing an oscillatory potential carrying a plurality of information, thereon, comprising first oscillator means producing a first constant frequency oscillating potential at a first phase angle, second oscillator means producing a second oscillating potential at the same constant frequency and including means variably shifting the phase of said second oscillating potential from said first phase angle in response to the magnitude of a first information, third oscillator means producing a third oscillating potential at the same constant frequency and including means variably shifting the phase of said third oscillating potential from said first phase angle in response to the magnitude of a second information; each of said second and third oscillator means comprising a geometric adding circuit, means coupling an output of said first oscillator means to said geometric adding circuit, means producing an information oscillating potential varying in amplitude in response to the magnitude of an information to be conveyed, means effecting a predetermined phase shift between said information oscillating potential and said first phase angle, and means coupling said phase shifted information oscillating potential to said geometric adding circuit; an output channel, and switching means coupled to the outputs of each of said oscillator means and to said output channel for successively placing said first, second and third oscillating potentials in said output channel each for a fixed period of time.

5. Apparatus for producing an oscillatory potential carrying a plurality of informations thereon comprising first oscillator means producing a first constant frequency oscillating potential at a first phase angle; second oscillator means producing a second oscillating potential at the same constant frequency and including means variably shifting the phase of said second oscillating potential from said first phase angle in response to the magnitude of a first information; said second oscillator means comprising means coupling an output of said first oscillator means and the output of a source of variable amplitude potential oscillation to a geometric adding circuit; third oscillator means producing a third oscillating potential at the same constant frequency and including means variably shifting the phase of said third oscillating potential from said first phase angle in response to the magnitude of a second information, and means successively switching the outputs of said oscillator means to an output channel.

6. The apparatus of claim 4 including amplitude limiter means coupled to the output of said geometric adding circuit.

7. The system of claim 2 wherein said apparatus is included in a color television transmitter, means producing first, second, and third signals respectively corresponding to the dot opacities of three primary colors being transmitted, and means respectively coupling said signals to said second and third oscillator means and to said modulator means to provide said first, second, and third informations.

8. The system of claim 7 wherein the means coupling said third signal to said modulator means includes an orthochromatic converter, portions of said first and second signals being coupled to said converter to modify the said third signal being applied to said modulator means.

References Cited in the file of this patent

UNITED STATES PATENTS

| | | |
|---|---|---|
| 2,333,969 | Alexanderson | Nov. 9, 1943 |
| 2,380,982 | Mitchell | Aug. 7, 1945 |
| 2,478,920 | Hansell | Aug. 16, 1949 |
| 2,558,489 | Kalfaian | June 26, 1951 |
| 2,568,250 | O'Brien | Sept. 8, 1951 |